US009377294B2

(12) United States Patent
Wu et al.

(10) Patent No.: US 9,377,294 B2
(45) Date of Patent: Jun. 28, 2016

(54) HANDHELD CELLULAR APPARATUS FOR VOLUME ESTIMATION (71) Applicant: Xerox Corporation, Norwalk, CT (US)

(72) Inventors: Wencheng Wu, Webster, NY (US); Edgar A. Bernal, Webster, NY (US); Lalit Keshav Mestha, Fairport, NY (US); Paul R. Austin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 453 days.

(21) Appl. No.: 13/920,241

(22) Filed: Jun. 18, 2013

(65) Prior Publication Data
US 2014/0368639 A1  Dec. 18, 2014

(51) Int. Cl.
*G01B 11/00* (2006.01)
*G01B 11/25* (2006.01)

(52) U.S. Cl.
CPC ............ *G01B 11/00* (2013.01); *G01B 11/2513* (2013.01); *H04M 2250/52* (2013.01)

(58) Field of Classification Search
CPC .............. G01B 11/00; G01B 11/2513; H04M 2250/52
USPC .................................................. 348/135–136
See application file for complete search history.

(56) References Cited

U.S. PATENT DOCUMENTS

| 2011/0182477 | A1* | 7/2011 | Tamrakar | G06T 7/0002 382/110 |
| 2012/0194516 | A1* | 8/2012 | Newcombe | G06T 17/00 345/420 |
| 2012/0200682 | A1 | 8/2012 | Mestha et al. | |
| 2012/0262577 | A1 | 10/2012 | Wang et al. | |
| 2013/0076913 | A1 | 3/2013 | Xu et al. | |
| 2013/0148847 | A1 | 6/2013 | Wang et al. | |
| 2014/0184496 | A1* | 7/2014 | Gribetz | G02B 27/017 345/156 |
| 2014/0293011 | A1* | 10/2014 | Lohry | H04N 13/0239 348/47 |

OTHER PUBLICATIONS

Shang, Junqing, et al. "Dietary intake assessment using integrated sensors and software." IS&T/SPIE Electronic Imaging. International Society for Optics and Photonics, 2012.*

(Continued)

*Primary Examiner* — Tat Chio
*Assistant Examiner* — Fabio Lima
(74) *Attorney, Agent, or Firm* — Philip E. Blair; Fleit Gibbons Gutman Bongini & Bianco P.L.

(57) ABSTRACT

What is disclosed is a wireless cellular device capable of determining a volume of an object in an image captured by a camera of that apparatus. In one embodiment, the present wireless cellular device comprises an illuminator for projecting a pattern of structured light with known spatial characteristics, and a camera for capturing images of an object for which a volume is to be estimated. The camera is sensitive to a wavelength range of the projected pattern of structured light. A spatial distortion is introduced by a reflection of the projected pattern off a surface of the object. And processor executing machine readable program instructions for performing the method of: receiving an image of the object from the camera; processing the image to generate a depth map; and estimating a volume of the object from the depth map. A method for using the present wireless cellular device is also provided.

12 Claims, 6 Drawing Sheets

(56) References Cited

OTHER PUBLICATIONS

Woo, Insoo, et al. "Automatic portion estimation and visual refinement in mobile dietary assessment." IS&T/SPIE Electronic Imaging. International Society for Optics and Photonics, 2010.*

Geng, Jason, "Structured-Light 3D Surface Imaging: A Tutorial", Advances in Optics and Photonics, vol. 3, Optical Society of America, Mar. 31, 2011, pp. 128-160, Optical Society of America.

Wu et al., "Estimating a Pose of a Camera for Volume Estimation", U.S. Appl. No. 13/905,788, filed May 30, 2013.

* cited by examiner

HANDHELD CELLULAR APPARATUS FOR VOLUME ESTIMATION

TECHNICAL FIELD

The present invention is directed to a wireless handheld cellular device configured with an illuminator for projecting a pattern of structured light and a camera which is sensitive to a wavelength range of the projected pattern of structured light. The wireless cellular device is specifically configured such that a volume can be estimated for an object in an image captured by a camera of the cellular device.

BACKGROUND

Obesity is an important issue for health care providers and health insurance companies. One factor for a healthy life is eating the right food. Efforts have been expended in determining a volume for a food item from an image of that item of food. There exists a need to be able to determine food volume and thus nutrient uptake while people are out eating at a restaurant, for example.

Accordingly, what is needed is a handheld apparatus capable of determining a volume of an object such as a food item, in an image captured by a camera of that apparatus.

BRIEF SUMMARY

What is disclosed is a specifically configured wireless cellular device capable of determining a volume of an object in an image captured by a camera of that apparatus. In one embodiment, the wireless cellular apparatus comprises an illuminator for projecting a pattern of structured light with known spatial characteristics, and a camera for capturing an image of an object for which a volume is to be estimated. The camera is sensitive to a wavelength range of the projected pattern of structured light. A spatial distortion is introduced by a reflection of the projected pattern off a surface of the object. A processor executing machine readable program instructions for performing the method of: receiving an image of the object from the camera; processing the image to generate a depth map; and estimating a volume of the object from the depth map. A method for using the wireless cellular device disclosed herein is also provided. Features and advantages of the above-described apparatus and method will become apparent from the following description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a wireless cellular device for determining a volume of an object in an image captured by a camera of that wireless cellular device. A method of using the present wireless cellular device is also disclosed.

Non-Limiting Definitions

"Receiving an image" is intended to be widely construed and means to retrieve, receive, or otherwise obtain one or more images for processing for volume estimation in accordance with the teachings hereof.

Figure 2:
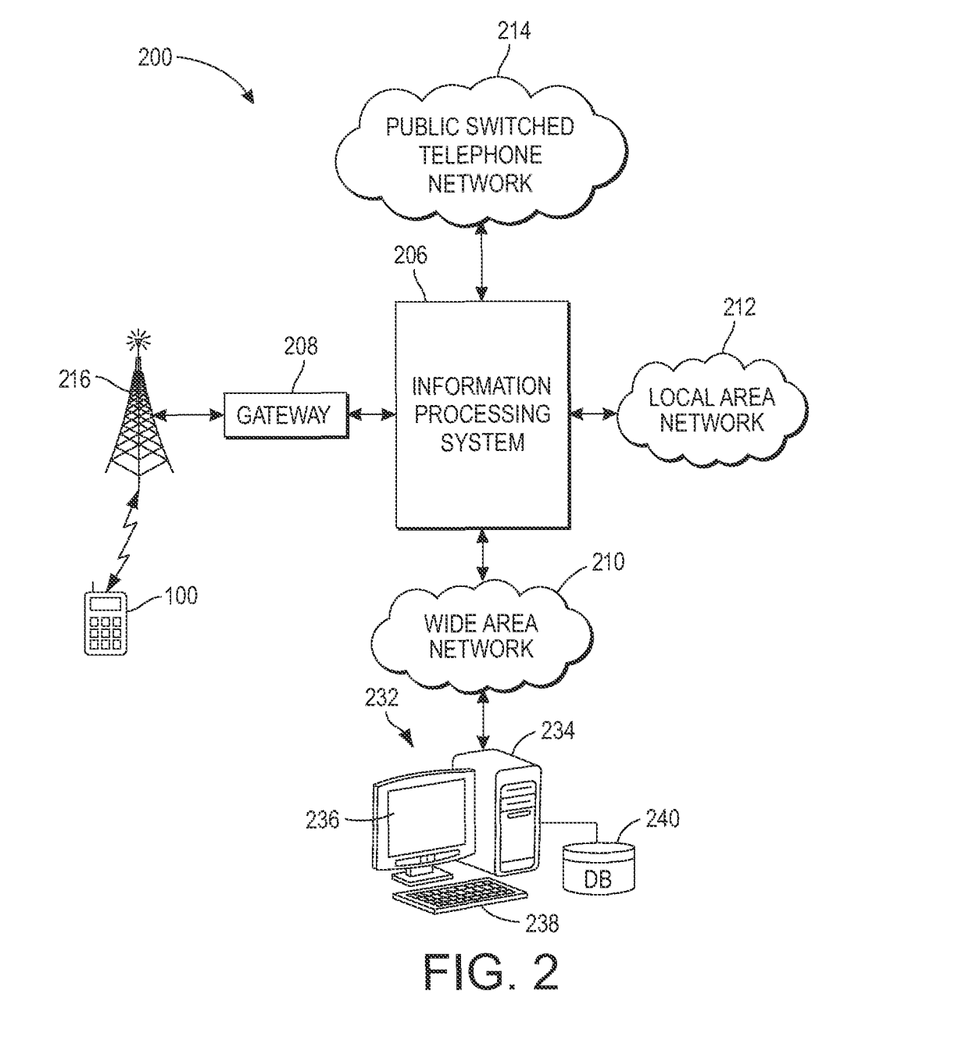
FIG. 2 illustrates one embodiment of a wireless cellular network comprising a plurality of networks which connect the present wireless cellular device to various networked systems.

A "wireless cellular device", also referred to herein as a "wireless handset" refers to a cellphone configured in a manner as disclosed herein which receives signals transmitted by remote devices, and wirelessly transmit signals to remote devices over a cellular network, such as the network of FIG. 2. Embodiments of a wireless cellular device are shown and discussed with respect to FIGS. 3 and 7. In various embodiments, the present wireless cellular device has a camera for capturing an image. The camera can be a monochrome camera, a RGB camera, an infrared camera sensitive in an infrared wavelength range, a multi-spectral camera, or a hyper-spectral camera. The camera may comprise a hybrid device that captures images in both a visible and infrared wavelength ranges. The present wireless cellular device further has an illuminator comprising a structured illumination light source which projects a patterned of structured light through a grid or window having known spatial characteristics. A multiplexor may be used to toggle the illuminator ON/OFF to achieve a desired periodicity. The volume is estimated from a depth map constructed from having processed the image of the object.

"Estimating a pose of a camera" relative to a surface upon which an object rests in an image captured by a camera such that a volume can be estimated for that object is disclosed in U.S. Pat. No. 8,995,754, entitled: "Estimating A Pose Of A Camera For Volume Estimation", by Wu et al., which is incorporated herein in its entirety by reference. This subject matter is discussed herein further with respect to FIG. 9

Figure 1:
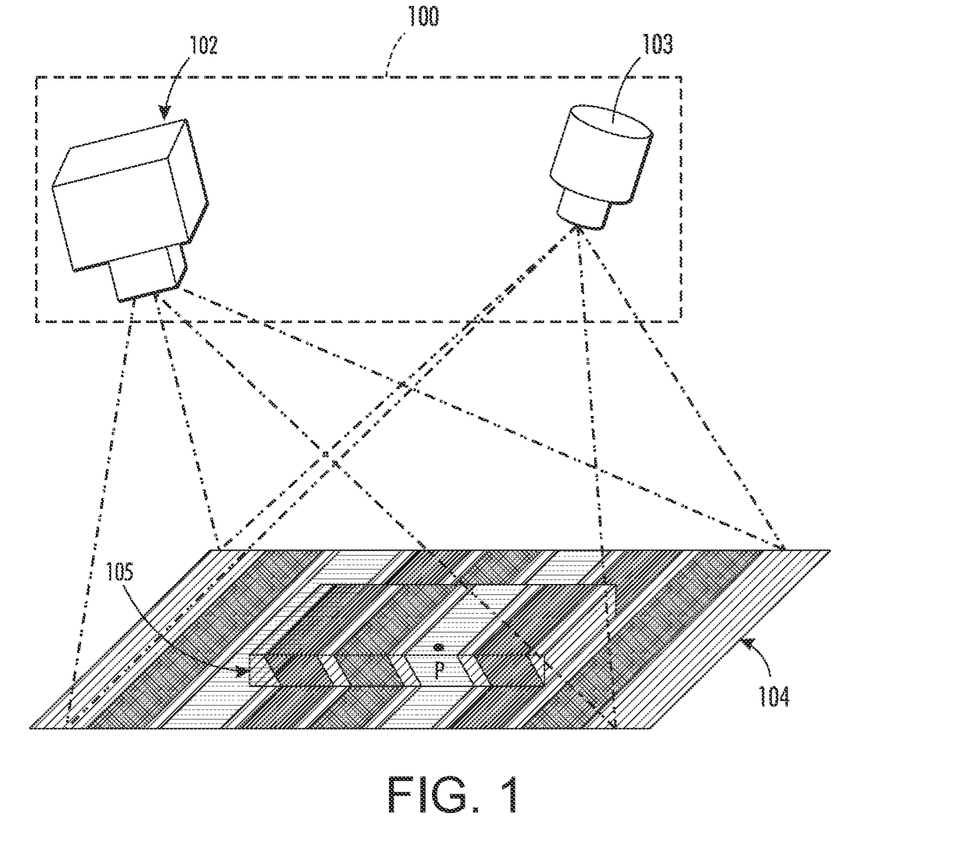
FIG. 1 shows a structured illumination source projecting sinusoidal gratings onto an object of interest and the reflection of the impinging sinusoidal gratings is captured by the camera as they bounce off the object.

A "depth map" contains depth values obtained from having performed a comparison of the known spatial characteristics with the spatial distortions introduced into that pattern by reflections of the structured light off the surface of the object at different locations. FIG. 1 shows one embodiment of the present handheld cellular apparatus 100 wherein a structured illumination source 103 projects sinusoidal gratings of known spatial characteristics 104 onto object 105. Reflections of the impinging gratings are captured by camera 102. If the surface is planar, i.e., without any 3D surface variations, and perpendicular to the optical axis of the camera, the pattern in the image will not be distorted. When the surface contains a non-flat or slanted 3D object, distortions are introduced in the projected pattern. These distortions are detectable in the image. The reader is directed to: "*Structured-Light 3D Surface Imaging: A Tutorial*", by Jason Geng, Advances in Optics and Photonics, Vol. 3, pp. 128-160, (Mar. 31, 2011), Optical Society of America, which is incorporated herein in its entirety by reference.

Example Wireless Cellular Network

Reference is now being made to FIG. 2 which illustrates one embodiment of a wireless cellular network 200 comprising a plurality of networks which connect the present wireless cellular device 100 to various networked systems.

Wireless cellular network 200 includes a cell tower 215 which is communicatively coupled via a gateway 208 using communications standard which broadly conform to present 3G/4G standards, as defined by the cellular industry. In FIG. 2, cell tower 216 is shown communicatively coupling wireless cellular handset 100 to an information processing system which, in turn, directs or re-directs data packets to any of: a wide area network 210, a local area network 212, and a telephone network 214, each of which support voice/data services using techniques and protocols which are beyond the scope of this disclosure. Shown in communication with wide area network 210 is workstation 232 comprising a computer case 234 wherein various hardware/software reside. Case 234 houses a motherboard which generally has a processor for executing machine readable instructions, a memory, various device controllers for controlling the reading/writing of data to/from various types of media such as, for instance, floppy disk, CD-ROM, DVD, hard drive, flash memory, to name a few. The motherboard is also in communication with a network interface card which facilitates the transmission of data over network 210. It should be appreciated that workstation 232 can be placed in communication with any of the networks 212 or 214. The workstation 232 includes a display 236 such as a CRT or LCD, a keyboard 238, and a mouse (now shown). The workstation is also in communication with storage device 240. Although storage device 240 is shown as an external device, it may reside within case 234.

Example Wireless Cellular Device

Figure 8:
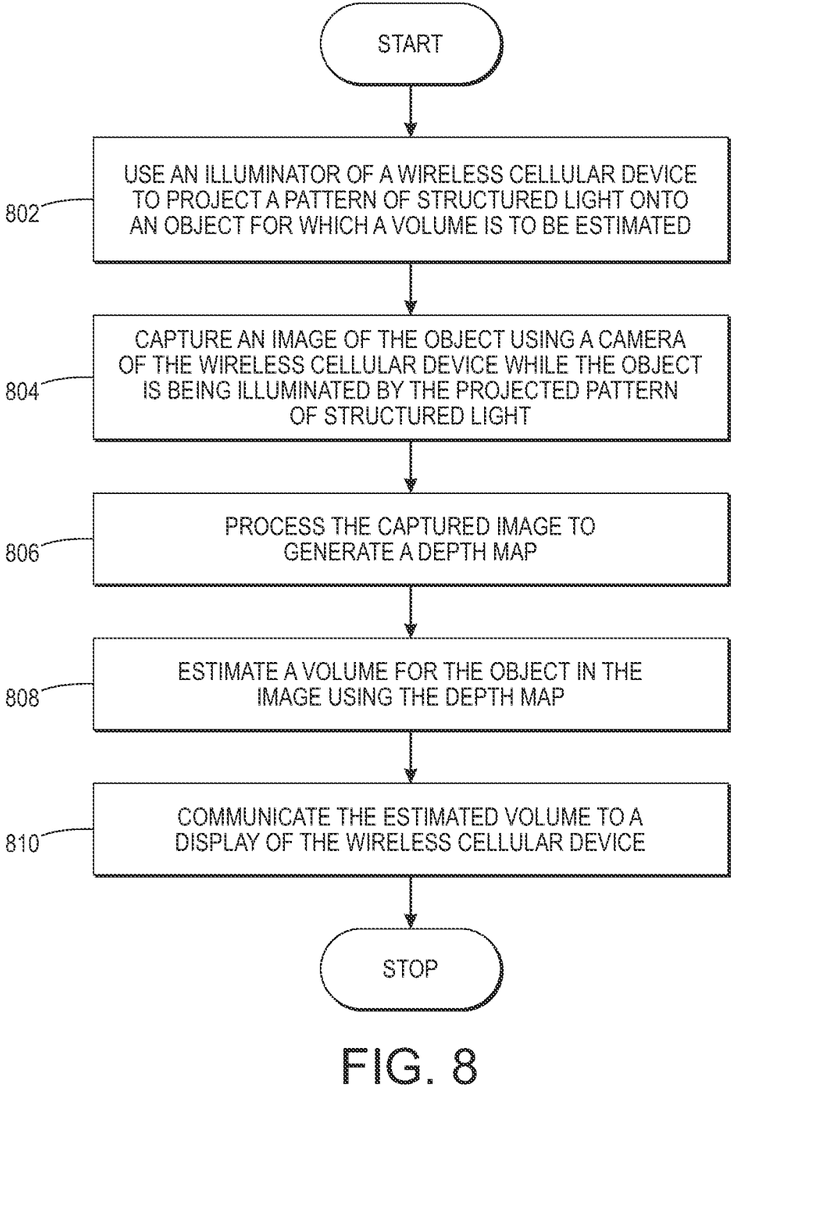
FIG. 8 is a flow diagram which illustrates one example embodiment of the present method for determining a volume of an object in an image captured by a camera of the wireless cellular device of FIGS. 3-6 and 7.

Reference is now being made to FIGS. 3-6 which illustrates one example wireless cellular device 100 in accordance with the teachings hereof for performing various aspects of the present method as discussed herein further with respect to the flow diagram of FIG. 8.

Figure 3:
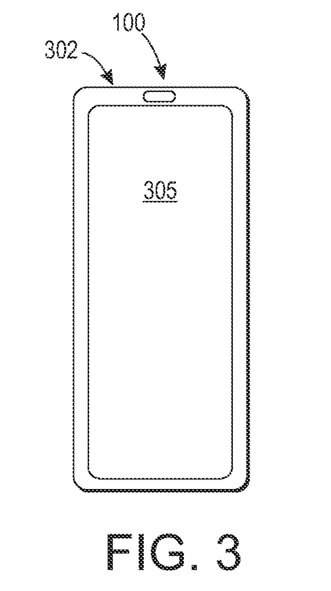
FIG. 3 illustrates a front view of one example wireless cellular device capable of utilizing in wireless cellular network of FIG. 2 in accordance with the teachings hereof.
Figure 4:
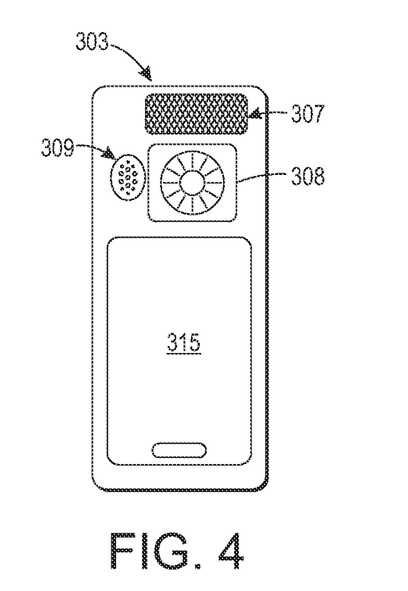
FIG. 4 shows a back view of the wireless device of FIG. 3.
Figure 5:
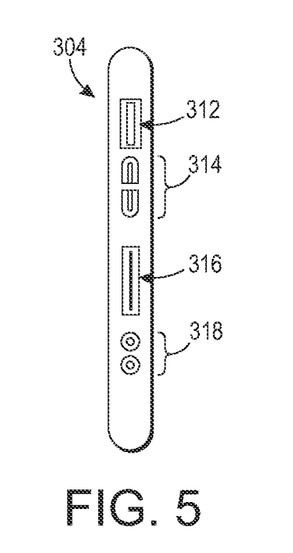
FIG. 5 shows a right side view of the wireless cellular device of FIG. 3.
Figure 6:
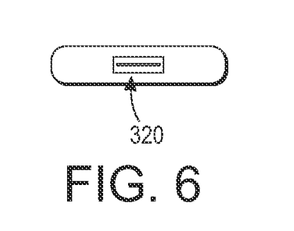
FIG. 6 shows a bottom side view of the wireless cellular device of FIG. 3.

Wireless cellular device 100 is a mobile device as is common known in the cellphone industry which utilizes in wireless cellular network of FIG. 2. In FIG. 3, on a front view 302 of the wireless handset device, is a touchscreen display 305 for displaying the estimated volume of an object. It should be appreciated that specialized software loaded onto the cellular device 100 monitors which area of the touch-sensitive screen has been touched and directs a processor to execute machine readable program instructions to effectuate an appropriate action or response thereto. The touchscreen is capable of displaying a virtual alphanumeric keyboard so that a used thereof can make entries or to provide information as needed. Other embodiments of the wireless cellular device of FIG. 3 may have a slideably retractable keyboard will full alphanumeric capabilities and special characters. As shown in FIG. 4, a back view 303 of the mobile cellular device 100 includes a battery 315, an audio speaker 309, and a camera 308 for capturing images of an object for volume estimation, and an illuminator for projecting a user-selectable pattern of structured light 307. The pattern of structured light projected by the illuminator 307 may be user-configurable using either software which displays various spatial patterns on the touch-screen display 305 for selection, or by having fixed a pre-configured pattern over the illuminator. FIG. 5 shows a right side view 304 of the wireless cellular device 100 which includes a USB port 312, an up/down volume control 314, a memory interface slot 316, and voice/audio jacks 318. FIG. 6 shows a bottom side view of the wireless cellular device 100 wherein a power connector 320 enables the handset to be connected to a charger.

Block Diagram of Example Wireless Handset Device

Figure 7:
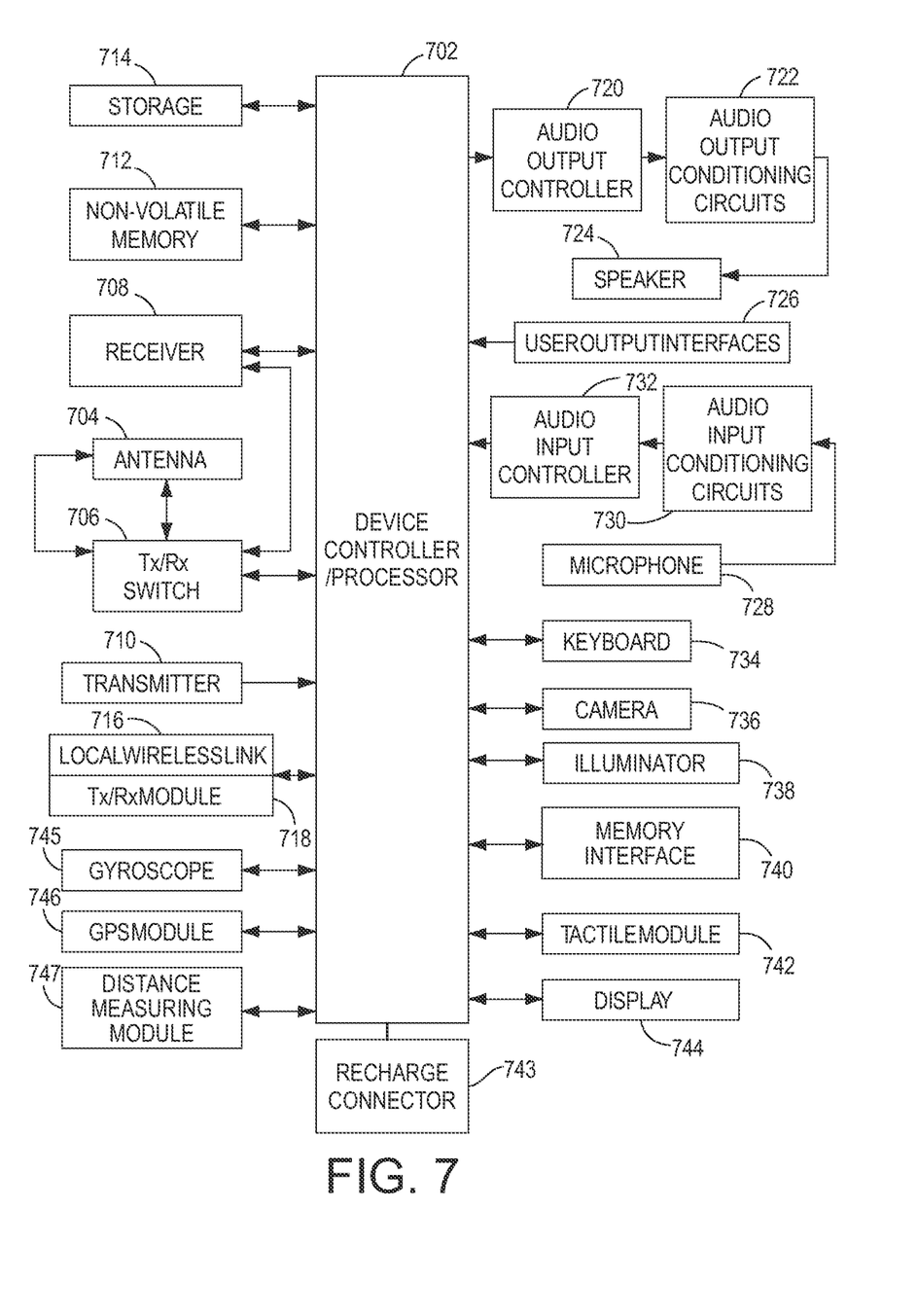
FIG. 7 illustrates a block diagram of the example wireless cellular device of FIGS. 3-6.

Reference is now being made to FIG. 7 which illustrates a block diagram of the example wireless cellular device of FIGS. 3-6. For brevity and clarity, the illustrated example omits details such as wires, screws, and other hardware that operatively connect the various elements of the mobile wireless device together. Such operative connective elements will be known to those skilled in the art. It should be appreciated that the described components conform to the design constraints of a chassis molding (not shown) having the form, in one example embodiment, of a style of the wireless cellular device of FIGS. 3-6. The chassis takes the form of a flip style phone which includes a pair of hinged sections with a display disposed on one section and a keypad disposed on the other. The chassis may have various body sections that rotate or slide relative to each other.

In the illustrated embodiment of FIG. 7, the wireless cellular device incorporates a device controller/processor 702 designed to control the various functions and operations intended to be performed thereby. The processor executes an operating system which is generally designed specifically for the device's hardware with respect to its intended functionality and features. Controller 702 facilitates the sending and receiving of wireless communication signals. The controller implements the baseband functions of mobile voice and data communications protocols such as GSM, GSM modem for data, GPRS and CDMA, as well as higher-level messaging protocols such as SMS and MMS. The controller also implements the baseband functions of local area voice and data communications protocols including Bluetooth. In receive mode, the device controller 702 communicatively couples antenna 704 through transmit/receive (Tx/Rx) switch 706 to receiver 708. The receiver decodes the received wireless signals and provides the decoded signals to the device processor. In transmit mode, the device controller communicatively couples the antenna through Tx/Rx switch 706 to transmitter 710 which transmits the communication signals. The device processor 702 operates the transmitter and receiver according to instructions stored in memory 712. The wireless device also includes non-volatile storage 714 for storing data, applications, software tools, and the like. Local wireless link 716 that allows the cellular device to communicate with other wireless devices without using the wireless communication network. The local wireless link may, for example, enable an embodiment of the wireless cellular device configured with Bluetooth, RF, Infrared Data Access (IrDA), and other wireless link technologies. Tx/Rx module 718 allows the device to transmit/receive communication signals to/from other similarly configured devices. The wireless cellular device includes an audio output controller 720 that receives audio signals from receiver 708 or from Tx/Rx module 718. Audio output controller 720 sends the received audio signals to audio output conditioning circuit 722 which perform various conditioning functions such as noise filtering to reduce noise and/or amplify the audio signal prior to providing that signal to speaker 724. User output interface 726 is a headphone jack, for instance. Microphone 728 enables a user to input audio into the device which, in turn, are provided to audio input conditioning circuit 730 which receives the audio signals and performs a conditioning function thereon to effectuate a filtering, noise reduction, and/or amplification. Audio input controller 732 receives the conditioned audio signals and sends a representation of the audio signal to device controller 702 for further processing depending on the nature of the operation intending on being performed on those audio signals. Keyboard 734 (or keypad) effectuates an input by the user. Such a keyboard may take the form of a qwerty keyboard, or a likeness thereof and may further include a joystick (or joystick-like feature) having a plurality of ranges of motion in different axes thereby allowing a user thereof to navigate various menu options available for selection on the display or to navigate a hierarchy of selectable iconic representations (widgets).

The wireless cellular device of FIG. 7 also includes a camera 736 for enabling a user to capture one or more images of an object for which a volume is intended to be estimated. The camera can be, for instance, a monochrome camera, a RGB camera, an infrared camera sensitive in an infrared wavelength range, a multi-spectral camera, a hyper-spectral camera, or may comprise a hybrid device that captures images in both a visible and infrared wavelength ranges. The camera is mounted to the chassis molding to enable image capture through a hole in a rear cover portion of the molding. The camera includes a lens assembly and an appropriate imaging circuit (or sensor) which is sensitive to a wavelength range of the illuminator. The camera is operated by one or more buttons on the wireless device. One of the buttons actuates the opening of the camera lens. Other buttons enable the camera to zoom-in/out or to focus more clearly on the object. The wireless device may also include sensors and/or motors (not shown) for electronically adjusting zoom, focus, aperture, exposure, f-stop, and the like, in relation to the camera. Captured images can be stored to memory 712, storage device 714, but may be directed or re-directed to a removable memory device which has been inserted into memory interface 740 which enables a user to plug a removable external device such a Micro-SD or other removable memory into the device. Illuminator 738 for projecting a pattern of structured light 307 comprising, for example, a sinusoidal pattern as shown in FIG. 1. The pattern of structured light projected by the illuminator may be user-configurable either by software which displays various selectable spatial patterns on the touchscreen display or by fixing a pre-configured pattern over the lens of the illuminator.

Tactile interface 742 controls the delivery of a tactile alert to the user through a vibrating motor or oscillating cam wherein a motor drives an eccentrically mounted weight which introduces a vibration into the chassis. Display module 744 which, in one embodiment, controls a touch-sensitive screen designed to accept an input from the user directly through a physical touching of the display surface by a fingertip or a stylus. Global Positioning System (GPS) module 746 determines a location and/or velocity of the wireless cellular device via a triangulation of GPS satellites. The GPS module may compute location using a triangulation of cell towers in communication with the wireless device. Recharger connection 743 enables recharging of a rechargeable battery (not shown) by an electrical AC-DC transformer. The data/recharge connector is configured to receive a complimentary plug of a transformer and a circuit in communication therewith receives a relatively small electrical charge from the transformer device and distributes that charge to the battery. Connection 743 may further enable uploading and downloading data to/from the wireless cellular device including machine executable software for carrying out the present method.

Distance measuring module 747 measures a distance from the handheld cellular device to an object of interest. The distance measuring device may comprise, for example, a laser pointer which emits a narrow beam of light directed at a point of aim and which has a sensor for detecting a reflection of that beam off the object. Machine readable program instructions are executed by a processor or by a specialized circuit such as an ASIC which calculates distance. A user places an object in the field of view of the camera lens and upon taking a snapshot of the image by, for example, having pressed a "camera" button (or camera icon widget) on a display screen, a beam is emitted from the handheld cellular apparatus at the object. A sensor on the handheld cellular device detects a reflection and proceeds to calculate a distance from the camera to that object. The calculated distance is a function of the time it took the beam to go from the handheld device, to the object, and back to a specifically configured sensor. The distance to the object may be stored to memory 712 or storage device 714, and may further be displayed on a display screen of the handheld cellular device in desired units such as, for instance, feet or meters. The distance measurement can be activated to occur concurrently when the camera captures an image of the object or it can be done separately when the user desires to obtain a distance measured to an object of interest. The distance may further comprise a set of real-world coordinates in (X,Y,Z) relative to a rotational position of the handheld device as determined by a gyroscope 745 which provides information of a relative tilt of the wireless cellular device, typically relative to the horizontal. A processor in the cellular device calculates an instant location of the aim point using trigonometric relationships and formulas that are well understood. Variables, formulas, tables, grids, maps with pre-defined positional points may further be stored/retrieved from storage device 714 or non-volatile memory 712 as are needed to perform any of their intended functions.

It should be appreciated that other functionality of any of these features may be controlled by software applications stored in memory which provide executable instructions to the processor. One or more of the components designed into any of the various electronic circuitry associated with any of the above-described features may further be controlled by an ASIC or other application specific device components. It should be understood that the embodiments of FIGS. 3-6 and 7 are not to be viewed as limiting the scope of the appended claims solely to the illustrations provided.

Any of the modules and processing units of the block diagram of FIG. 7 can be placed in communication with one or more devices over the wireless cellular network 200 of FIG. 2. Various modules may designate one or more components which may, in turn, comprise software and/or hardware designed to perform the intended function. A plurality of modules may collectively perform a single function. Each module of the block diagram of FIG. 7 may have a specialized processor capable of executing machine readable program instructions specific for their intended function. A plurality of modules may be executed by either a single special purpose computer system or a plurality of special purpose processors in parallel. Connections between modules include both physical and logical connections. Modules may include software/hardware which may further comprise an operating system, drivers, controllers, and the like.

Example Flow Diagram

Reference is now made to the flow diagram of FIG. 8 which illustrates one example embodiment of the present method for determining a volume of an object in an image captured by a camera of the wireless cellular device of FIGS. 3-6 and 7. Flow processing begins at step 800 and immediately proceeds to step 802.

At step 802, use an illuminator of a wireless cellular device to project a pattern of structured light having known spatial characteristics onto an object for which a volume is intended to be estimated.

At step 804, capture an image of the object using a camera of the wireless cellular device while the object is being illuminated by the projected pattern of structured light. Spatial distortions are introduced by a reflection of the projected pattern off a surface of the object.

At step 806, process the image to generate a depth map. In various embodiments hereof, processing takes the form of comparing spatial characteristics of the reflections detected in the image to known spatial characteristics of the projected pattern such that spatial distortions introduced into that pattern by reflections off the object can be characterized. The characterized spatial distortions, at different locations on a surface of the object, are then used to calculate a depth map. Processing the image may further involve image segmentation. Image segmentation is a technique for identifying and extracting one or more objects of interest from an image. This can be achieved in a plurality of ways. For example, regions of objects can be identified in images using, object identification, pixel classification, material analysis, texture identification, and pattern recognition methods. "*System And Method For Object Identification And Tracking*", U.S. Pat. No. 9,025,024, by Xu et al., discloses a method for analyzing images to identify objects such that those objects can be tracked as they move across the scene. "*Post-Processing A Multi-Spectral Image For Enhanced Object Identification*", U.S. Pat. No. 8,818,030, by Wang et al., discloses a system and method for post-processing a multi-spectral image which has been pre-processed via a pixel classification method such that objects in the image are more correctly identified. "Method For Classifying A Pixel Of A Hyperspectral Image In A Remote Sensing Application", U.S. Pat. No. 9,019,358, by Mestha et al., discloses a system and method for simultaneous spectral decomposition suitable for image object identification. "Determining A Number Of Objects In An IR Image", U.S. Pat. No. 8,587,657, by Wang et al., discloses methods for classifying pixels in an image such that an object in the image can be identified.

At step 808, estimate a volume of the object from the depth map. In various embodiments hereof, the volume is estimated by tessellating surface points of the depth map, computing a reference point location comprising one of: a centroid, a weighted arithmetic mean, and a rank-ordered statistic of surface point locations, connecting triangles in the tessellation with the reference point to form tetrahedrons; computing a volume of each of the tetrahedrons; and aggregating the volumes to obtain the volume estimation for the object. The accuracy of the volume estimation can benefit from knowledge of the camera pose relative to the surface on which the object whose volume is to be computed lies. This is especially useful for mobile device use since it is desirable to grant the user the freedom to acquire images from varying poses that are not limited to top-views or views where the surface on where the object whose volume is to be computed lies is perpendicular to the optical axis of the system. In one embodiment, the camera pose at which each image was acquired is determined based on the depth distribution of the surface (e.g. a table or a plate), on which the object lies. The estimated camera pose is then used to adjust the terms that are added to estimate the volume of the object and thus improve the accuracy of volume estimation. In another embodiment, the user is provided with feedback on how to position the portable device until a preferred pose for imaging the food items is reached based on the camera pose estimated dynamically. The volume of the object is then estimated on the image acquired at a preferred pose. In yet another embodiment, the user is instructed to acquire a temporal sequence or video signal of depth maps while following a simple pattern that includes preferred poses such as top-view and front-view. Camera pose estimation is then performed on individual video frames to extract a sub-set of images with preferred camera poses. This subset of images can then be used for volume estimation.

Figure 9:
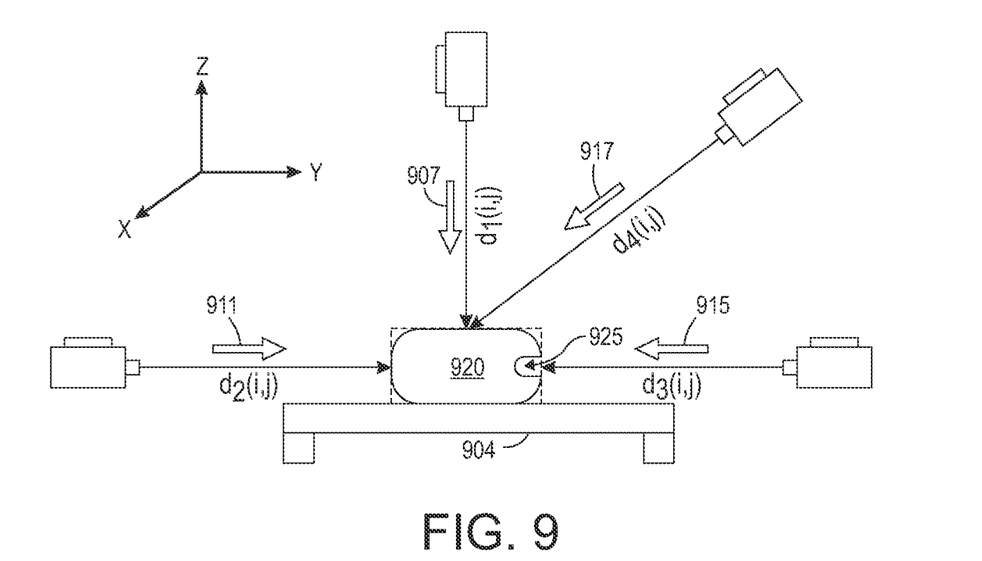
FIG. 9 illustrates an example embodiment wherein multiple perspectives of a camera are used for volume estimation of an object on a surface.

FIG. 9 illustrates an example embodiment wherein multiple perspectives of a camera are used for volume estimation of object 920 lying on surface 904. The volume estimation starts with an image captured by a camera of wireless cellular device 100 from a top view perspective 907 and the corresponding depth map $d_1(i,j)$. It should be appreciated that the estimated volume obtained for the object by having processed the image taken from top-view 907 is not entirely accurate due to inherent object characteristics such as irregularity 925 that, in this illustration, is occluded from the camera's field of view. As such, additional images can be used to improve volume estimation such as, for instance, using images captured by the camera from side view perspectives 911 and 915 with corresponding depth maps $d_2(i,j)$ and $d_3(i,j)$, respectively. However, the volume estimated for the object using all three side views may, in some instance, still not be entirely accurate. This may be due to the total estimated volume not having taken into account a portion of the volume absent because of object irregularity 925. In this scenario, additional images of the object can be taken by the camera from, for example, oblique view 917 and the corresponding depth map $d_4(i,j)$ used to improve the estimated volume. Multiple-view volume estimation is generally preferred when the object item is not fully in contact with the surface on which it lies (e.g., has a curved shape) or when there are irregularities in the object which are not captured by a particular camera viewpoint. The present method is not limited to any single viewpoint and multiple views provide a better estimation of the total volume of the object. Volume computation is more complex since angle corrections are required as disclosed in the above-incorporated reference entitled: "Estimating A Pose Of A Camera For Volume Estimation", by Wu et al. It should be appreciated that in some volume estimation scenarios, knowledge of the object using, for example, a model of the object's symmetry, or assumptions about the characteristics of the object's shape (i.e., an orange is round, a box is square, and the like), can further be included in the determination of the estimated volume for improved accuracy.

At step 810, communicate the estimated volume to a display of the wireless cellular device. In this embodiment, further processing stops. In other embodiments, the estimated volume is communicated to a remote device over the cellular network. In yet another embodiment, the object in the image is identified using, for instance, an object identification technique, and a model of the identified object is retrieved and used to refine the volume estimation. For example, if the object is round such as an orange, a model of that object can be used to refine the volume estimation based on the a priori knowledge of that object in the image. A user may selectively input information about the object using, for example, a keypad of the wireless cellular device. The entered information can then be used to refine the volume estimation.

Information about the object and the estimated volume may be communicated to a remote device over the wireless cellular network, such as the one shown and discussed with respect to FIG. 2. Such communication may take the form of a message such as a text message, an audio message, a video message, or any combination thereof. In the instance where the object is an item of food, the user may input information about the type of food comprising the object and, in other embodiments hereof, an amount of a nutrient uptake is estimated for the food item based upon the estimated volume and nutritional information obtained from the USDA Food and Nutrient Database for Dietary Studies (FNDDS). In such a manner, a user can use their cellphone to take a picture a particular food item and have a nutritional uptake displayed for them on the display screen. It should be appreciated that some or all of the of the steps of the methods disclosed herein may be performed, in whole or in part, by a remote device placed in communication with the wireless handset such as, for instance, the workstation 232 of FIG. 2.

The flow diagrams depicted herein are illustrative. Operations may be added, modified, enhanced, or consolidated. The flowcharts and the embodiments described herein can be implemented on a micro-processor or dedicated circuit such as, an ASIC, which is incorporated into a wireless cellular device as configured herein. Such an electronic circuit would be placed in communication with other components of the wireless handset such as, the GPS module, the illuminator, the camera, memory, storage, and the like, as is needed to effectuate an implementation of the teachings hereof. Portions of the flow diagrams may also be implemented partially or fully in hardware in conjunction with machine executable instructions which can be loaded onto a memory of the wireless handset and executed by a processor therein. Moreover, the teachings hereof can be implemented in hardware or software using known or later developed systems, devices, and/or software.

Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Changes to the above-described embodiments may be made without departing from the spirit and scope of the invention. The teachings of any printed publications including patents and patent applications, are each separately hereby incorporated by reference in their entirety.

What is claimed is:

1. A method for determining a volume of an item of food in an image captured by a camera of a wireless cellular device, the method comprising:
   selecting a pattern with known spatial characteristics from a display of a wireless cellular device;
   using an illuminator of said wireless cellular device to project the selected pattern onto an item of food for which a volume is intended to be estimated;
   using a camera of said wireless cellular device to capture multiple images of said item of food at different angles while said item is being illuminated by said projected pattern, a spatial distortion being introduced by a reflection of said pattern off a surface of said food item;
   measuring at least one distance to said food item using a distance measuring module of said wireless cellular device;
   inputting information about the food item using said wireless cellular device;
   estimating, based on said measured distances, a camera pose for each of said multiple images;
   identifying a sub-set of images with preferred camera poses, said sub-set comprising images in at least one top view perspective, at least two side view perspectives, and at least one oblique view perspective;
   calculating multiple depth maps where depth map $d_1(i,j)$ corresponds to said top view perspective, depth maps $d_2(i,j)$ and $d_3(i,j)$ correspond to said two side view perspectives respectively, and depth map $d_4(i,j)$ corresponds to said oblique view perspective, each of said depth maps being calculated based on depth distributions of a surface on which said food item lies by comparing spatial characteristics of reflections detected in each image to known spatial characteristics of said projected pattern such that spatial distortions introduced into said pattern reflections off said food item can be characterized at different locations on a surface of the food item, said characterizations being used to calculate said depth maps in each perspective;
   estimating a volume from each of said depth maps;
   aggregating said volumes estimated from each of said depth maps to obtain a final estimated volume for said food item;
   retrieving, from a memory of said wireless cellular device, a model which identifies a symmetry of said food item;
   using said retrieved model to refine said final estimated volume; and
   displaying said refined final estimated volume on a display of said wireless cellular device.

2. The method of claim 1, wherein said camera comprises any of: a monochrome camera, a RGB camera, a multi-spectral camera, a hyper-spectral camera, and an infrared camera.

3. The method of claim 1, further performing image segmentation on said image such that said food item can be extracted from said image in advance of said volume estimation.

4. The method of claim 1, further comprising communicating said volume estimation to a remote device.

5. The method of claim 4, wherein said communication is in the form of a message comprising any of: a text message, an audio message, and a video message.

6. A wireless cellular apparatus for determining a volume of an item of food in an image captured by a camera of that apparatus, the wireless cellular apparatus comprising:
   a user interface for selectively inputting information about the food item and for selecting a pattern with known spatial characteristics;
   an illuminator of a wireless cellular device to project the selected pattern onto an item of food for which a volume is intended to be estimated;
   a camera for capturing multiple image of said item of food from different angles while said item is being illuminated by said projected pattern, a spatial distortion being introduced by a reflection of said projected pattern off a surface of said food item;
   a distance measuring module for measuring at least one distance to said food item; and
   a processor executing machine readable program instructions for performing:
      estimating, based on said measured distances, a camera pose for each of said multiple images to identify a sub-set of images with preferred camera poses, said sub-set comprising images in at least one top view perspective, at least two side view perspectives, and at least one oblique view perspective;
      calculating multiple depth maps where depth map $d_1(i,j)$ corresponds to said top view perspective, depth maps $d_2(i,j)$ and $d_3(i,j)$ correspond to said two side view perspectives, respectively, and depth map $d_4(i,j)$ corresponds to said oblique view perspective, each of said depth maps being calculated based on depth distributions of a surface on which said food item lies by comparing spatial characteristics of reflections detected in each image to known spatial characteristics of said projected pattern such that spatial distortions introduced into said pattern reflections off said food item can be characterized at different locations on a surface of the food item, said characterizations being used to calculate said depth maps in each perspective;

estimating a volume from each of said depth maps;

aggregating said volumes estimated from each of said depth maps to obtain a final estimated volume for said food item;

retrieving, from a memory of said wireless cellular device, a model which identifies a symmetry of said food item;

using said retrieved model to refine said final estimated volume; and displaying said refined final estimated volume on a display of said wireless cellular device.

7. The apparatus of claim 6, wherein said camera comprises any of: a monochrome camera, a RGB camera, a multi-spectral camera, a hyper-spectral camera, and an infrared camera.

8. The apparatus of claim 6, further performing image segmentation on said image such that said food item can be extracted from said image in advance of said volume estimation.

9. The apparatus of claim 6, further comprising displaying said volume estimation on a display of said wireless cellular device.

10. The apparatus of claim 6, further comprising communicating said volume estimation to a remote device.

11. The apparatus of claim 10, wherein said communication is in the form of a message comprising any of: a text message, an audio message, and a video message.

12. The apparatus of claim 6, wherein said food item is an item of food.

* * * * *